May 16, 1950 — F. HOTCHNER — 2,507,788
DISPLAY WITH ANIMATION EFFECTS
Filed Nov. 24, 1945 — 3 Sheets-Sheet 1
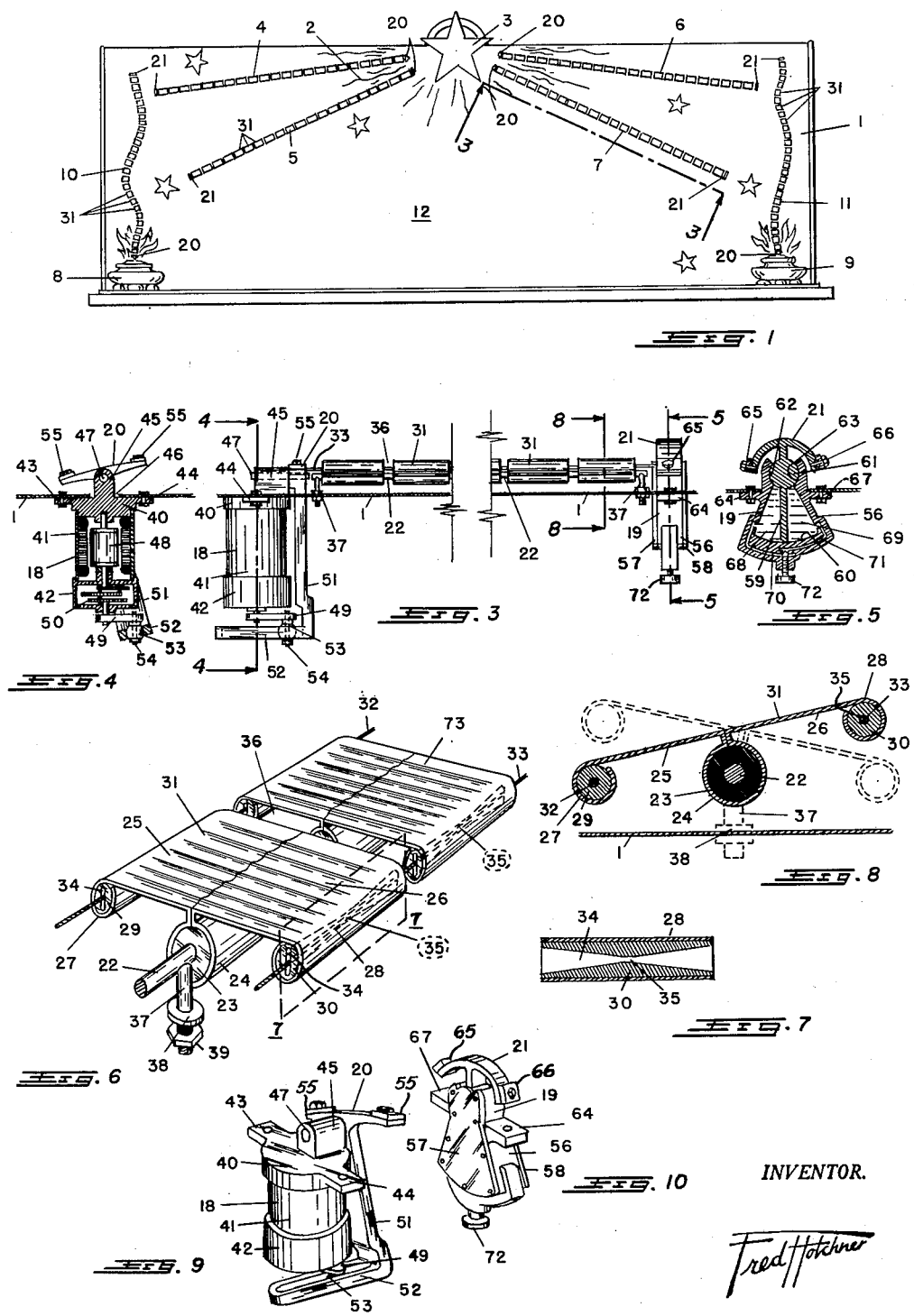
INVENTOR.
Fred Hotchner May 16, 1950     F. HOTCHNER     2,507,788
DISPLAY WITH ANIMATION EFFECTS
Filed Nov. 24, 1945     3 Sheets-Sheet 2
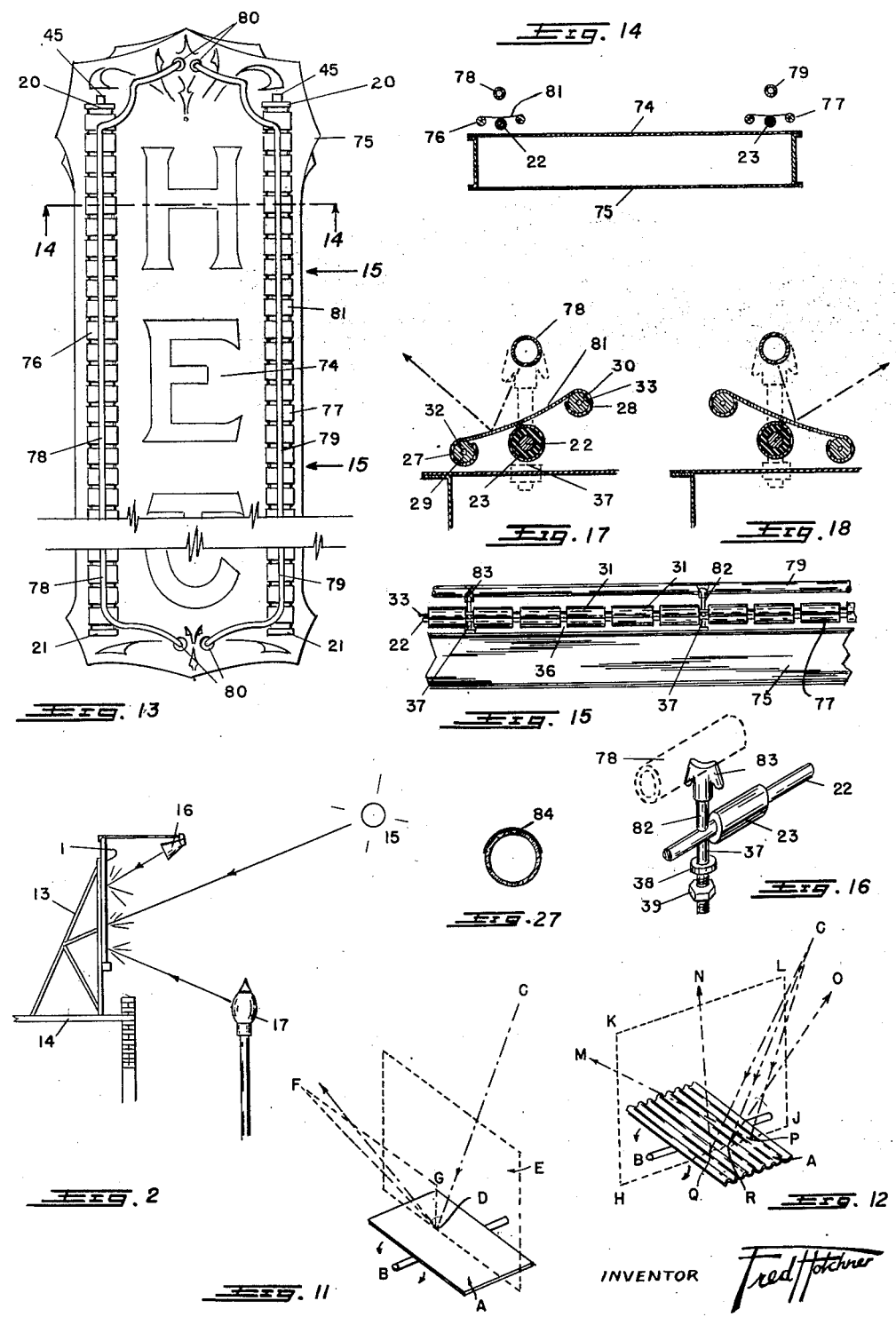
INVENTOR
Fred Hotchner May 16, 1950          F. HOTCHNER          2,507,788
DISPLAY WITH ANIMATION EFFECTS
Filed Nov. 24, 1945          3 Sheets-Sheet 3
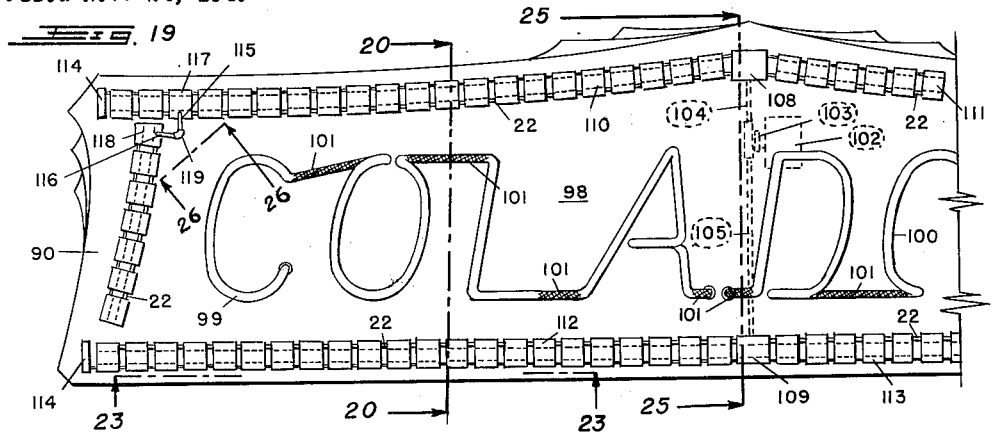
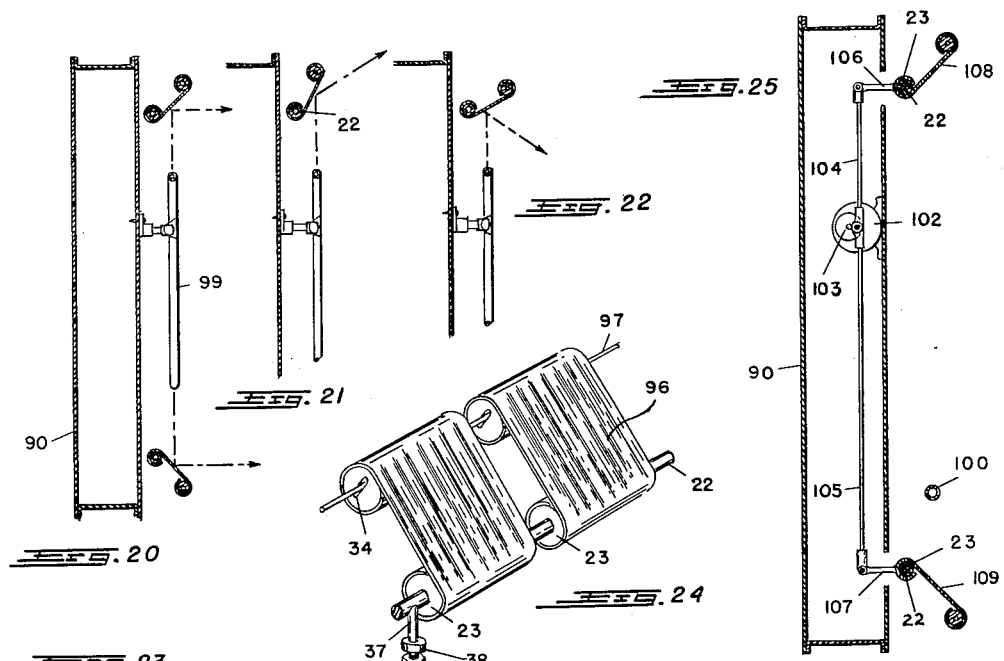
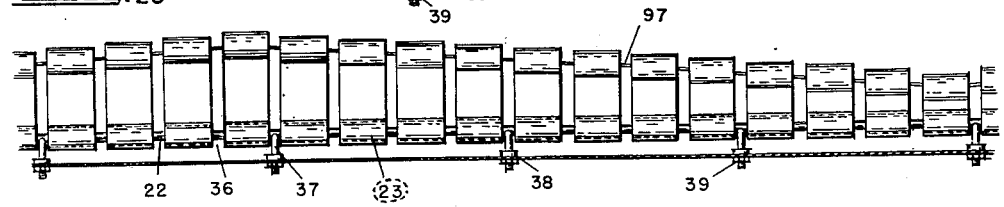
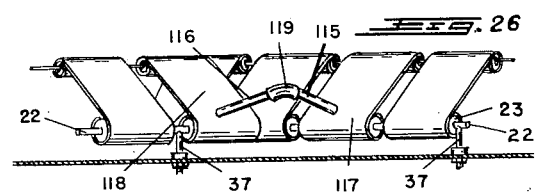
INVENTOR
Fred Hotchner

UNITED STATES PATENT OFFICE 2,507,788

DISPLAY WITH ANIMATION EFFECTS

Fred Hotchner, Los Angeles, Calif.

Application November 24, 1945, Serial No. 630,658

15 Claims. (Cl. 40—139)

This invention relates to displays with animation effects and is useful in the production of a wide variety of indoor and outdoor signs, exhibits, bulletin boards and decorative installations. It provides such devices constructed to exhibit effects of motion or animation along character, inscription or decorative outlines to beautify their appearance, enhance their attractiveness and increase their decorative and advertising value over that of prior art devices.

Distinct and vivid effects simulating motion at relatively high speed and extending for considerable distances over the backgrounds of the displays are produced by the operation of very simple apparatus in which the moving parts are displaced for very short distances and move at relatively low speed, thus making for simple, low cost and rugged devices which consume little power and operate free from mechanical trouble under severe service conditions.

The invention provides for the centralization of the driving units in a single or a very few locations readily accessible for inspection and maintenance. The moving parts over the backgrounds are light and securely held and free from hazard to persons when the displays are installed over traveled locations.

The invention makes use of vibratile elements, each presenting a reflecting surface, coupled one to the next in series along feature outlines over the backgrounds of display devices. These elements are so constructed with relation to the sources of light that, as they vibrate, they reflect the light in beams to the field of view and sweep the field of view with these beams to produce the animation effects. They are connected to each other in such manner that the vibration of one element is transmitted to successive elements along the series according to the laws of elastic wave motion. For this reason I have termed the series "elastic wave transmission lines" and described the operation in the nomenclature of physics.

The various objects of the invention will be apparent in the following specification read in view of the drawings.

The invention is disclosed in three species distinguished by arrangement of parts to utilize radiation from these three different kinds of light sources.

In the first species the vibratile elements have reflecting surfaces conformed and moved during oscillation so as to receive radiation from a source such as the sun, nearby street lights, or general illuminating lights in front of the board, and sweep the field of view with the reflected beams.

In the second species the line of vibratile elements is directly associated with an elongated illuminant following the outline to be animated with the illuminant either provided with means to prevent its radiating direct rays to the field of view or exposed to direct view as part of the illuminated copy.

The invention in its third species provides vibratile elements in transmission lines definitive of display inscriptions flanking electric lights definitive of other display copy and making use of the side radiation of such lights to reflect beams to the field of view to create the effect of lighted outlines in animation.

The invention is shown in certain preferred embodiments in the accompanying drawings in which the same reference numeral appearing in several views is used to indicate the same or the equivalent part throughout. All mechanisms shown in connection with the disclosure of individual species are to be understood as applicable to all of the species in proper adaptation. In the drawings:

Figure 1 is a front elevation of a display board of the outdoor, road side or roof type, provided with means to produce animation effects by the reflection of light rays from extraneous sources to the field of view by vibrating mirrors disposed in series along feature outlines of a pictorial design on the board. The device is shown in the inactive condition with all moving parts in the medial positions. This view with the associated views below described illustrates the first species of the invention.

Figure 2 on a reduced scale illustrates the board in side elevation as located on a roof to show the modes of reflection of light from different extraneous source in the production of display effects.

Figure 3 is a sectional elevation through the background of the board taken as indicated by the section line 3—3 in Figure 1, shortened by the cut-out of a number of vibratile elements. The line is shown inactive with all moving parts in the medial positions.

Figure 4 is a sectional view of the motive unit taken as indicated by the section line 4—4 in Figure 3 and in projection position with respect to that view. The crank and driving arm are shown moved to one extreme position corresponding to extreme displacement of the vibratile elements to better illustrate the mechanism.

Figure 5 is a projected sectional view of the resistance unit or wave damper at the opposite end of the line from the driving unit taken as indicated by the section line 5—5 in Figure 3. The rocker arm is shown in the medial position.

Figure 6 is a perspective view of two of the vibratile elements fragmented out of a transmission line to show more clearly certain details of construction. Figure 7 is a cross section through one of the weights on the elements, taken as indicated by the section plane 7—7 in Figure 6 to show the bearing maintained by the cables on the vibratile elements.

Figure 8 is a cross section transverse through one of the vibratile elements and the background, showing the element in one extreme position of its oscillation in solid lines and in the opposite extreme position in broken lines. The relative position of the studs which hold the line to the background sheeting is indicated by broken lines.

Figure 9 is a perspective view of the driving unit as it would be seen from a point of view above, to the left, and forward from the plane of the drawing in Figure 3. Figure 10 is a similarly arranged view of the wave damper.

Figures 11 and 12 are diagrams illustrating the preferred configuration of the reflector surface as shown in Figure 6 as regards the selective diffusion of light rays thereby as compared with reflection from a plane mirror surface, the better to cover the field of view with beams reflected in the production of animation effects.

Figure 13 is a front elevation, shortened by the cut-out of the mid-section, of a vertical electric street sign provided with series of vibratile elements associated together in elastic wave transmission lines immediately to the rear of gaseous conduction lighting tubes. This, and the associated views, illustrate the second species of the invention in which the animation effect is produced by the reflection to the field of view of light rays radiated backward to the sign by the tubes in both cases: that in which the light normally radiated to the front is wholly or partially obstructed, and in the case in which the forward radiation of the tube participates in the display effect. All elements are shown in their inactive medial positions.

Figure 14 is a cross section of the sign shown in Figure 13, taken as indicated by the section line 14—14, showing the relative positioning of the background, vibratile elements and luminous tubes.

Figure 15 is a side elevation of a portion of the sign taken as indicated by the arrows 15—15 in Figure 13 showing the details of support for the transmission line and the luminous tube.

Figure 16 is fragmented view in perspective of a short length of the support bar on which the elements are mounted, showing one of the rubber tubes in place, one of the support studs for securing the line to the background and one of the tube supports, and the tube in broken lines.

Figures 17 and 18 are cross sections on enlarged scale transverse through one of the vibratile elements and the sign body, showing the element in the two extreme positions of its oscillation. The relative positions of the mounting studs and tube posts are indicated by broken lines, and certain rays by dot and dash lines.

Figure 19 is a front elevation of a horizontal electric street sign, constructed according to the third species of this invention, shortened by the cut-off of one end. Several series of vibratile elements are arranged in elastic wave transmission lines along the course of border outlines and constructed to reflect light from luminous tubes definitive of copy matter in the center of the sign to the field of view as they oscillate when in action to produce the effect of a lighted border in animation. The elements are shown inactive and in their medial positions.

Figure 20 is a cross section of the sign taken as indicated by the section line 20—20 in Figure 19 showing the relative positioning of sign body, the luminous tubes defining the copy, and the vibratile elements of the transmission lines in the position of rest. Certain rays are illustrated in dot and dash lines to show the direction of reflection of rays from the luminous tube, in the plane of the tube, to the reflectors and thence to the field of view.

Figures 21 and 22 are similar cross sections showing the upper vibratile element in the two extreme positions of its oscillation, and by dot and dash lines, the mode of reflection of light rays from the luminous tube to the field of view in the production of the animation effect.

Figure 23 is a sectional elevation of the transmission line on an enlarged scale as seen in a view taken as indicated by the section line 23—23 in Figure 20 showing the mounting of the line to the background and illustrating the displacement of the vibratile elements, as seen from the side, by an elastic wave on the line.

Figure 24 is a perspective view of two of the vibratile elements fragmented out of a line showing a preferred configuration of the reflecting surface to insure full coverage of the field of view with the reflected beams.

Figure 25 is a cross section of the sign taken as indicated by the section line 25—25 in Figure 19 showing the use of a central driving unit to operate two or more lines by distant drives through rods or the equivalent means.

Figure 26 is a sectional view taken as indicated by the section line 26—26 in Figure 19 showing the coupling of two lines meeting at a sharp angle.

Figure 27 is a cross section of a luminous tube showing the application of a coating of translucent or opaque material over the front surface to prevent direct radiation of light to the field of view from the tubes of the device of the second species, illustrative of all means of restricting or eliminating direct radiation from the tubes to the field of view.

Figure 1 shows a display sign having a background, indicated by numeral 1, on which is exhibited a painted design 2, certain outline features of which are to appear animated when the device is in operation.

The sign may be constructed generally according to any of the accepted practices so far as the mechanical features of this invention are concerned. Usually such signs are constructed of sheet metal panels framed with wood, and supported by steel bar or wood board frames to the roof, ground or other mounting surface. In nearly all cases ample access may be had to the rear of the board for installation and care of the mechanical elements preferably mounted on the rear. In the very few cases in which such access is not to be had, very simple provisions may be made to reach all parts of the apparatus from the front by means of removable covers.

The transmission line operates with very little energy transfer and negligible energy dissipation to the board. Hence little or no reenforcement need be added to typical sign constructions to accommodate the apparatus. The reaction of the oscillations at the ends of the line may be met by the mass of the motive and damping units, or if necessary by an added mass, so that it is not necessary to impose such load on the sign body. In no case is any serious mechanical problem involved. It is thus entirely practicable to add transmission lines to signs already in place to provide animation along feature outlines of their showing.

In the design exhibited by this board, a painted star 3 radiates the linear streamers represented by the straight transmission lines 4, 5, 6 and 7 as part of its pattern of rays. From the fire pots 8 and 9, two curved smoke trails rise, represented by the curved transmission lines 10 and 11, as part of the design of fire and smoke. In the manner explained below, when the device is in operation and light from an extraneous source falls on the board, light beams are reflected back to the field of view by oscillating reflectors which are actuated by the waves on the lines to produce animation along the lines.

The lines are shown in the inactive condition in this view with the fine detailing of the cables and support bars eliminated because of the small scale. The space 12 in the center of the board is provided for the reception of advertising copy.

In Figure 2 the board is shown mounted to the steel frame 13 which supports it from the roof 14. Three different extraneous light sources are indicated in this view. The sun, indicated by 15, is one source of radiation. Bill board reflectors, such as indicated by 16 may be provided. Street lights, such as that indicated by 17, or other lighted signs or lights from windows may be relied upon to furnish illumination. As a road side sign, the light of approaching cars in the night time is utilized to produce a particularly effective display.

Referring now to Figures 3 to 10: Each transmission line comprises a series of vibratile elements, each having a mass and a resilient body forming an oscillating couple, all mechanically associated together in an elastic wave transmission line. Each of the vibratile elements includes a member having a reflecting surface 73 disposed to reflect light rays to the field of view and sweep the field of view with the reflected beams as it is moved during oscillation.

The vibration of any one of the elements is transmitted to the adjacent elements and thence to successive elements along the line according to the laws of wave motion, constituting the line a mechanical analog of an electric transmission line.

As is well known, an impedance of the proper value at the end of a transmission line will absorb the energy of waves reaching it so that none is reflected and wave motion along the line will be from the point at which the energy is applied to the impedance, or "unidirectional" wave motion. For the mechanical lines of the instant invention a resistance unit of the proper value, located at the end of the line opposite from the end at which the energy is applied to vibrate the elements, will absorb the waves so that the wave motion is in one direction, and an observer in the field of view will see what appears to be a brilliant traveling effect moving in one direction along the line because of the manner in which he is reached by the reflected beams from successive elements therealong.

Along such a line many types of wave motion may be set up. For a very substantial proportion of designs unidirectional waves are desired, as is the case with designs such as that shown in Figure 1. The preferred means of establishing unidirectional waves on the line is an oscillating motive unit, such as that shown and indicated by 18 at one end of the line, and a resistance unit or wave damper 19 at the opposite end of the line. The rocker arms 20 of the motive units and the rocker arms 21 of the dampers are indicated in Figure 1.

It is noted that it is necessary to bring electric connection to the motors to but the three regions, the two fire pots and the star, to provide animation over the very extensive surface of the board. As a matter of fact, any number of lines may be driven from a single motor, requiring electric service to but a single point, by the use of rod or cable drives from the one location. Such a drive is illustrated in connection with the views and description of the sign constructed according to the third species of the invention below. It is obvious, of course, that numerous types of motive units may be used. Since very little power is required to drive these lines, wind power, spring power and falling weight drives are entirely practicable for use on signs in locations remote from electric service.

Various constructions of the transmission line may be used within the purview of my claims. I have shown a line built along a support rod 22 to which are cemented a series of tubes of resilient rubber or other elastic material, indicated by 23. A plate of metal is formed up to provide the tubular portion 24 fitting tight around and cemented to the tube 23, the two plate arm portions 25 and 26, the exposed surfaces of which comprise the reflector, and the tubular end portions 27 and 28 which hold the weights 29 and 30. The entire unit, indicated generally by 31, comprises a vibrating couple, the weight of the plate together with the weights 29 and 30 acting against the elasticity of the rubber tube in torsion.

A suitable means of coupling each of the vibratory elements to its two neighbors is provided by the two cables 32 and 33 which pass through the openings 34 through the weights. In order to reduce the bending of these cables, the openings through the weights are tapered from the ends to the center, as shown in Figure 7 in the plane corresponding to the vibrations of the cables. The bearing of the cable against the vibrating couple is thus made at the points indicated by 35 and the effective length of the free cable between elements is substantially that of the center to center spacing of the elements along the line.

Preferably a small space, as indicated by 36 is left between adjacent elements so that the line may be bent to follow moderate curves such as those indicated by 10 and 11 in Figure 1. Since only transverse pressure is exerted on the weights by the cables, it is preferable that they pass free through the openings and be held taut by the rocker arms of the motive and damper units. The line is secured to the background of the sign by means of the studs 37 welded to the support rod at intervals along the rod in spaces between adjacent elements. Each stud has a flange 38 which bears against the background when the nut 39 is tightened from the rear. The cables are held taut between the rocker arms of the motor and damper.

Considering now the reactions produced in the background by waves on the line: As each of the rubber tubes is twisted by a displacement of the element, there is a corresponding strain on the rod in torsion. By making the rod of proper section this strain is transmitted along the rod to the region where the wave is in opposite phase and the strain is in the opposite hand. However, the section of the rod may be reduced by taking advantage of the reenforcement which it receives from the background. It is noted that the reaction which the studs transmit to the background is in the plane of the background where it is received and resisted in the most effective possible manner. The rod and the background thus reenforce each other against vibrations from the waves on the line.

Various types of motive units may be used to drive the lines. I have chosen for purposes of illustration an electric drive of the positive type which will impose a definite wave motion on the line. The unit includes the housing formed by the base casting 40, the housing shell 41 and the gear housing 42. The base casting is provided with two ears 43 and 44 by means of which it is bolted to the rear surface of the background with the boss 45 passing through the opening 46 in the background to carry the stud shaft 47 in alignment with the support rod of the transmission line.

The high speed rotor 48 within the housing drives the crank 49 through the gear train 50. The rocker arm 20, integral with the drive arm 51 oscillates on the stud shaft 47. As its lower end it carries the slotted cross arm 52 which is driven by the crank 49. The spherical roller 53 on the crank pin 54 serves to maintain association without backlash between the pin and the drive arm and reduce friction. The cables are held to the rocker arm by the clamps 55.

The damper includes the body 56 having the integral ears 64 and 67 by means of which it is bolted to the rear surface of the background. This body is in the form of an open shell which together with the two end plates 57 and 58 forms a wedge shaped chamber in which the blade 59 moves, sweeping over the inside surfaces of the covers and the bottom wall 60 of the chamber. The blade is integral with the cylindrical member 61 which turns in the cylindrical seats 62 and 63 of the body and carries the rocker arm 21 to which the cables are attached by the clamps 65 and 66.

The blade 59 divides the chamber into two spaces 68 and 69, tending to force fluid out of one space and draw fluid into the other space as it oscillates. These two spaces are in communication with each other through the passages 70 and 71 and the needle valve 72. By adjustment of the valve the resistance to fluid flow between the spaces is varied. By variation in the properties of the fluid used the capacity of the unit to introduce a factor of resilience in the end of the line may be controlled. Generally a non-compressible fluid such as hydraulic brake fluid is preferred furnishing pure resistance in the unit to received wave motion.

Various types of wave motion may be set up along these lines with corresponding variations in the effects observed. Generally, however, unidirectional waves are preferred as they lend themselves to the production of the more vivid effects. Such wave motion is effected by the application of an impedance of the proper value at the end of the line to completely absorb the energy delivered at the end and prevent reflections.

By the use of an adjustable wave damper the finer adjustment of this impedance may be effected on the location. Various types of dampers of the fixed impedance type may be used in practical cases adequate for the production of acceptable animation effects. Where the reflected wave is not undesirable, the end of the line may be anchored and thus the damper may be dispensed with, or the line may be left free to vibrate at the end, for particular desired wave conditions.

In practice, of course, these transmission lines will extend in all angles across the background, and the light sources may be at numerous different angles therewith. If the reflecting surfaces of the vibratile elements are plane and of mirror brightness light rays from a sharp source will be reflected to the field of view back and forth along a plane, and will be seen only along the line of intersection of this plane with the ground surface over which the observer might move. The direction of this line will vary with the angle of the source to the background and the angle of the line across the board.

In Figure 11 is shown a reflector A having a flat mirror surface, arranged to oscillate in rotation around the axis B. A ray of light from a source C is incident at the point D on this reflector. At this point the reference plane E is erected perpendicular to the surface of the reflector and the direction of the axis. It is apparent that, regardless of the position of the source at one side of the reference plane the incident beam will be reflected to the opposite side of the plane, and the oscillation of the reflector will serve only to sweep this reflected beam over a plane such as that indicated by D, F, G. It is apparent also that, since we are dealing with a plane mirror, if the source is distant from the device, all rays falling on the mirror will be reflected in the same fashion so that we are practically dealing with a beam of narrow divergence rather than with a ray. What is said about the restriction of the effect to a very narrow area across the field of view still holds. What is required to produce practical effects is that the reflected light must be swept over the greater part of the normal field of view, from any source at a reasonable angle to the background and regardless of the angle of the transmission line across the board.

In Figure 12 is illustrated a reflector provided with corrugations extending transverse of the direction of the axis B. Light from this source will be diffused in the plane of incidence, thus: Consider a reference plane erected along a line paralleling the axis and perpendicular to the reflector. This plane is indicated by H, J, K, L. Every ray incident on the reflector will have a component of its angle of incidence in this plane. Hence, various rays from a source C in this plane incident on various parts of the reflecting surface cut by the plane will be reflected in various different directions along the plane because of the various angles of the surface at the different points of incidence, as indicated by the rays reflected toward M, N, and O from the points of incidence P, Q and R.

Thus, every ray falling on the reflector will undergo reflection having a dispersion factor lengthwise of the axis. The aggregate result is that light from a source of reasonable distance from the reflector will be reflected into a fan shaped beam of narrow divergence in the direction transverse of the axis. As the reflector turns around its axis this beam is swept across the field of view and will cover the major portion of that field regardless of the direction in which the transmission line extends across the board. An observer in the field will see a light flash at the location of the reflector only at that instant in which the beam is crossing his position, which is the end sought.

If now we have a series of such reflectors in an elastic wave transmission line vibrating in response to a wave on the line, the observer will be reached by beams from successive reflectors in a sequence directly dependent on the nature of the wave. That is, if a unidirectional wave is on the line, he will be reached by beams from successive reflectors in the direction of the movement of the wave and will observe bright spots moving in that direction along the feature outline of the design displayed on the background.

This will hold for all positions in the normal field of view for beams reflected from a source located within a wide solid angle in front of the display. This will also hold when the display is illuminated by several sources, unless the sources are so numerous that one cancels the other out in the action, a condition which will rarely occur in practice.

In the preferred embodiment of the invention in its second species shown in Figure 13 and associated views, sign 75 is of the vertical type with two straight runs of tubing following the courses of the vertical runs of a design painted on the background. Positioned to the front of the transmission lines 76 and 77 are the tubes 78 and 79, which are formed to turn toward the center of the sign at the top and bottom to complete the lighted border and enter suitable openings at the points indicated by 80 to make contact with the usual source of electric current. Painted copy is shown on the background in the central area 74, although any suitable delineation of copy may be used so far as the features of the border in this species of the invention are concerned.

Except for the slight modifications described below these transmission lines are similar to the lines described above and may be bent to follow moderate curves. In the figure they are shown with the rocker arms of the driving and damper units exposed to the front of the sign, and the same reference numerals indicate the same parts.

Since the light source is relatively close to the reflecting surfaces of the vibratile units it is of advantage to give these surfaces a concave formation toward the tube as indicated at 81. The exact curvature is a matter of empiric test as several factors enter to take this out of the class of conventional reflectors. The position of the source is changing with respect to the reflector as it vibrates, and for that reason a curve which would give the greatest concentration of the beam when the reflector is in the medial position would not be the most desirable in formation for the reflector in its extreme position. Furthermore, the radiation from the tube lengthwise of the line which falls on the reflectors travels different distances before it reaches the reflecting surfaces and is incident at different angles to the points of incidence. It is clear that there is no curve which can be generated which would be theoretically correct for any more than a small part of the total radiation which is effective in the action. The selection of a contour for the reflectors is a matter of test to determine the formation which yields the best results under practical working conditions.

This radiation lengthwise of the tube enters the case in another way. What has been said above in explanation of the desirability of corrugating the reflectors transverse of the line should now be reconsidered in view of the fact that the source in this case is sending a substantial part of its light up and down the line. As light will reach each point of each of the reflectors from numerous angles lengthwise of the line it will reflect in numerous directions lengthwise of the line, in many instances, eliminating the necessity of employing corrugations as shown in Figures 6 and 24.

In Figures 17 and 18, by dot and dash lines, the throw of the reflected beam in the two directions is shown for one point of incidence in each view. These ray lines hold not merely for a single ray in the given direction and along the given route in the plane of the drawing, but for all the rays in all directions lengthwise of the tube in the plane including the line and perpendicular to the drawing.

In Figure 16 the studs 82 are welded to the support bars 22 at intervals between adjacent vibratile units. These studs carry insulating tube supports 83 of conventional type at their outer ends to which the tubes are secured in the usual fashion by soft copper wire. At the ends of the sign where the tubes leave the transmission lines the usual supports from the background are provided.

The luminous tubes may be used with or without a light obstructing coating on the front to reduce or eliminate the direct radiation of light from the tubes to the observers. In Figure 27 I have indicated by numeral 84 a coating on the front of the tube which may be of translucent pigment to color or dim down the light, reflecting material to reflect the light backward toward the reflectors, or opaque material to completely block the light radiated forward from the luminous gas column. A desirable arrangement would be to color and dim the light to provide a relatively dim and contrasting line of light along the course of the tube. The tubes at the top and bottom of the sign are preferably left uncoated where the animation does not appear, to complete the border design.

This invention may be practiced according to its third species to construct signs in which transmission lines of vibratile elements, definitive of certain inscription matter, are used in flanking position to lighted copy matter, making use of the lateral radiation from the lights to an illuminated animation effect. This lateral radiation, in prior art signs, is usually wasted as it neither reaches the observer to directly define the inscription matter, or reaches the background to contribute anything to the display.

In Figure 19 the transmission lines, arranged as borders on the sign 90, are very similar to those described above. The vibratile elements include the single arms, indicated by 96, instead of the double arm arrangement. A single cable 97 is used instead of two cables. Otherwise the general details are very much the same and are indicated by the same reference numerals.

In the central space 98 the luminous tubes 99 and 100 are arranged to define the lighted copy. Any other form of lighted copy matter may be provided, as for instance, copy outlined by incandescent lamps. The vibratile elements are shown in their inactive condition and in their medial positions in this view.

When the reflector is in a medial position, as shown in Figure 20, a ray from one of the luminous tubes is reflected directly forward to the field of view. As the reflector swings between extreme positions this ray is swept back and forth over the field of view. There will be a divergence of the beam in the plane of the drawing if the reflectors are flat as shown due to the relative closeness of the source. To some extent this may be corrected by curving the reflectors in the fashion shown in Figure 17. However, in the practical case this is not an important feature and may be neglected.

In this embodiment of the invention corrugation of the reflectors transverse of the line, as shown in Figure 24, is advantageous due to the fact that the radiation of light from the luminous tube is non-uniform to various points along the line, and flat reflectors may appear dark at all times at certain positions along the border as viewed from certain positions in the field of view. This is to be expected at such places as those opposite the portions of the tubes indicated by 101 which, being connecting runs between the letters, are ordinarily blacked out. This is corrected by the corrugations which diffuse the light in the direction lengthwise of the transmission line to produce a fan shaped beam from each reflector which reaches over the width of the normal field of view and insures illumination of the entirety of the line as viewed from all points in that field.

To avoid a multiplicity of driving units, it is entirely practicable to operate a sign having a number of transmission lines covering a considerable area from a central power unit as shown in Figure 25 in cross section.

In this device, a centrally located motor 102, having a driving crank wheel 103 turning at the desired speed, operates the two upper lines by means of the rod 104 and the two lower lines by the rod 105. These rods drive the cranks 106 and 107 which are tight to the vibratile elements 108 and 109, each of which drives the two adjacent lines 110 and 111, and 112 and 113, respectively. By modifications and extensions of this example, according to known mechanical devices, any number of lines at various distances from the driving unit and extending in various different directions over the surface of the background, may be operated. Rocker arms 114 of damper units are shown in this view, their use being optional.

Transmission lines may be operated one from the other when desired. An example of such an arrangement is shown in the upper left hand corner of the sign in Figure 19. Here a sharp corner in the border is to be negotiated by the coupling of one line to another. A very simple arrangement for effecting the transfer of vibratory energy is the provision of the cranks 115 and 116 on the vibratile units 117 and 118. These cranks are connected by the flexible link 119, the arrangement being clearly shown in elevation in Figure 26.

It is to be understood that the invention is not limited to the embodiments shown, or in its application to the details of construction or arrangement of parts illustrated, since it is capable of other embodiments and of being carried out in various ways. Also, it is to be understood that the phraseology or terminology employed herein is for the purpose of description and not of limitation, and it is not intended to limit the invention claimed herein beyond the requirements of the prior art.

The terms "inscription outline" and "outline" embrace any kind of inscription or lineation.

Having thus described my invention, what I claim is:

1. A display device including an elongated illuminant, a plurality of vibratile reflector units connected one to the next in an elastic wave transmission line by means through which the vibration of one unit is transmitted to successive units along the line as elastic wave motion, said transmission line being coextensive with and positioned to the rear of said illuminant, each of said reflector units having a reflecting surface to reflect light rays in a beam from said illuminant to the field of view and to sweep the field of view with said beam in its oscillation in response to elastic waves on said transmission line, and means to impose elastic waves on said transmission line.

2. A display device including an elongated illuminant in the form of an inscription, a plurality of vibratile reflector units connected one to the next in an elastic wave transmission line by means through which the vibration of one unit is transmitted to successive units along the line as elastic wave motion, said transmission line extending along the course of another inscription to one side of the first said inscription, each of said reflector units having a reflecting surface to reflect light from the said illuminant in a beam to the field of view and to sweep the field of view with said beam in its oscillation in response to elastic waves on said transmission line, and means to impose elastic waves on said transmission line.

3. In a display device, a series of vibratile reflector units connected one to the next in an elastic wave transmission line by means through which the vibration of one unit is transmitted to successive units along the line as elastic wave motion, said transmission line being definitive of an inscription outline, each of said units having a reflecting surface to reflect light rays derived from a source extraneous to said display device, and in its oscillation in response to wave motion on said transmission line, to sweep the field of view with the resulting beam, and means to establish unidirectional wave motion on said transmission line.

4. In a display device, a series of vibratile reflector units, each individually resiliently mounted to a common support and connected one to the next in an elastic wave transmission line by means through which the vibration of one unit is transmitted to successive units along the line as elastic wave motion, said transmission line being definitive of an inscription outline, each of said units having a reflecting surface to reflect light rays derived from a source extraneous to said display device, and in its oscillation in response to wave motion on said transmission line, to sweep the field of view with the resulting beam, and means to establish unidirectional wave motion on said transmission line.

5. In a display device, a series of vibratile reflector units, each individually resiliently mounted to a common support and connected one to the next in an elastic wave transmission line by means through which the vibration of one unit is transmitted to successive units along the line as elastic wave motion, said transmission line being definitive of an inscription outline, each of said units having a reflecting surface to reflect light rays derived from a source extraneous to said display device, and in its oscillation in response to wave motion on said transmission line, to sweep the field of view with the resulting beam, and means to establish wave motion on said transmission line.

6. A display device including a background member displaying a design, an outline feature of which is to be rendered in apparent animation, a series of vibratile reflector units connected one to the next in an elastic wave transmission line by means through which the vibration of one unit is transmitted to successive units along the line as elastic wave motion, said transmission line extending along the course of said outline, each of said units having a reflecting surface to reflect light rays derived from a source extraneous to said display device, and in its oscillation in response to wave motion on said transmission line, to sweep the field of view with the resulting beam, and means to establish unidirectional wave motion on said transmission line.

7. A display device including an elongated illuminant, a plurality of vibratile reflector units connected one to the next in an elastic wave transmission line by means through which the vibration of one unit is transmitted to successive units along the line as elastic wave motion, said transmission line extending along the course of said illuminant, each of said units having a reflecting surface to reflect light from said illuminant to the field of view and to sweep the field of view with the resulting beam in its oscillation in response to wave motion on said transmission line, and means to impose wave motion on said line.

8. A display device including an elongated illuminant, a plurality of vibratile reflector units connected one to the next in an elastic wave transmission line by means through which the vibration of one unit is transmitted to successive units along the line as elastic wave motion, said transmission line extending along the course of said illuminant, each of said units having a reflecting surface to reflect light from said illuminant to the field of view and to sweep the field of view with the resulting beam in its oscillation in response to wave motion on said transmission line, and means to establish unidirectional wave motion on said transmission line.

9. A display device including an elongated illuminant, a plurality of vibratile reflector units individually resiliently mounted to a common support and connected one to the next in an elastic wave transmission line by means through which the vibration of one unit is transmitted to successive units along the line as elastic wave motion, said transmission line extending along the course of said illuminant, each of said units having a reflecting surface to reflect light from said illuminant to the field of view and to sweep the field of view with the resulting beam in its oscillation in response to wave motion on said transmission line, and means to impose wave motion on said line.

10. A display device including illuminating means definitive of display inscription matter, a series of vibratile reflector units definitive of other display inscription matter positioned to one side of the first said inscription matter, each of said units having a reflecting surface to reflect light from said illuminating means to the field of view and, in its oscillation in response to vibratory impulses, to sweep the field of view with the resulting beam, and means to vibrate said vibratile units.

11. A display device including illuminating means definitive of display inscription matter, a series of vibratile reflector units definitive of other display inscription matter positioned to one side of the first said inscription matter, said vibratile units being connected one to the next in an elastic wave transmission line by means through which the vibration of one unit is transmitted to successive units along the line as elastic wave motion, each of said units having a reflecting surface to reflect light from said illuminating means to the field of view and, in its oscillation in response to wave motion on said transmission line, to sweep the field of view with the resulting beam, and means to impose wave motion on said transmission line.

12. A display device including illuminating means definitive of display inscription matter, a series of vibratile reflector units definitive of other display inscription matter positioned to one side of the first said inscription matter, said vibratile units being independently resiliently mounted to a common support and connected one to the next in an elastic wave transmission line by means through which the vibration of one unit is transmitted to successive units along the line as elastic wave motion, each of said units having a reflecting surface to reflect light from said illuminating means to the field of view and, in its oscillation in response to wave motion on said transmission line, to sweep the field of view with the resulting beam, and means to impose wave motion on said transmission line.

13. A display device including illuminating means definitive of display inscription matter, a series of vibratile reflector units definitive of other display inscription matter positioned to one side of the first said inscription matter, said vibratile units being connected one to the next in an elastic wave transmission line by means through which the vibration of one unit is transmitted to successive units along the line as elastic wave motion, each of said units having a reflecting surface to reflect light from said illuminating means to the field of view and, in its oscillation in response to wave motion on said transmission line, to sweep the field of view with the resulting beam, and means to establish undirectional wave motion on said transmission line.

14. A display device including a plurality of vibratile reflector units connected one to the next in an elastic wave transmission line by means through which the vibration of one unit is transmitted to successive units along the line as elastic wave motion, said transmission line extending along the course of an inscription outline, each of said units having a reflecting surface to reflect light from an extraneous source to the field of view in its oscillation in response to wave motion on said transmission line and to sweep the field of view with the reflected beam, and means to impose wave motion on said transmission line to thus produce the effect of animation along said inscription outline.

15. A display device including a background member along which a plurality of vibratile reflector units extend in a series in delineation of an inscription outline, said units being connected one to the next in an electric wave transmission line by means through which the vibration of one unit is transmitted to successive units along the line as elastic wave motion, each of said units having a reflecting surface to reflect light from an extraneous source to the field of view in its oscillation in response to wave motion on said transmission line, and means to impose wave motion on said transmission line to thus produce the effect of animation along said inscription outline.

FRED HOTCHNER.

REFERENCES CITED

The following references are of record in the file of this patent:

UNITED STATES PATENTS

| Number | Name | Date |
|---|---|---|
| 1,626,286 | Keenan | Apr. 26, 1927 |
| 2,389,911 | Hotchner | Nov. 27, 1945 |